F. E. BRICKNER.
GAS BOX ATTACHMENT.
APPLICATION FILED DEC. 6, 1907.
904,933.
Patented Nov. 24, 1908.
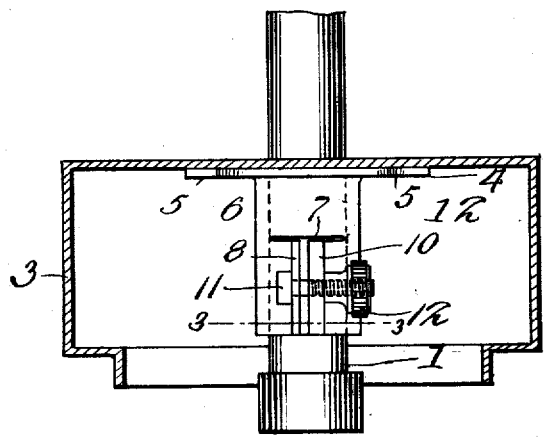
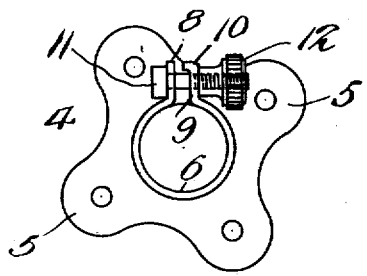
Frederic E. Brickner,
Inventor

UNITED STATES PATENT OFFICE.

FREDERIC E. BRICKNER, OF SARATOGA SPRINGS, NEW YORK.

GAS-BOX ATTACHMENT.

No. 904,933.  Specification of Letters Patent.  Patented Nov. 24, 1908.

Application filed December 6, 1907. Serial No. 405,457.

*To all whom it may concern:*

Be it known that I, FREDERIC E. BRICKNER, a citizen of the United States, residing at Saratoga Springs, in the county of Saratoga and State of New York, have invented new and useful Improvements in Gas-Box Attachments, of which the following is a specification.

This invention relates to connectors for securing electric outlet and distributing boxes upon the gas outlet pipes of buildings, and the object of the invention is to provide a device of this character which may be readily and easily positioned upon a pipe to effectively secure the distributing box thereon, and which may be readily removed from the pipe when desired.

With these and other objects in view the invention resides in the novel construction of devices hereinafter fully described and claimed.

In the drawings, Figure 1 is a front elevation of the improved coupling showing the same supporting a box and connected to a pipe. Fig. 2 is a bottom plan view of a coupling. Fig. 3 is a sectional view upon the line 3—3 of Fig. 1.

In the construction of buildings the gas pipes within the buildings are extended through the ceilings and walls of the buildings, their ends being screw threaded for the reception of the gas fixtures. The extending ends of these pipes project a few inches beyond the wall or ceiling into the room and are provided with a threaded cap to prevent the entrance of dust or dirt into the pipe before the gas fixture is applied. When it is desired to employ electricity for lighting the building instead of gas, the cap for the pipe is allowed to remain upon the pipe, and the pipe itself frequently used as a ground for electric wires.

In the accompanying drawings the numeral 1 designates the gas pipe. The numeral 3 designates a distributing or outlet box for electric wires, of the ordinary construction. This box is provided with a connector, comprising a sleeve 6 having a plurality of ears 5, each of which is suitably perforated for the reception of retaining elements by which the connector 4 is secured upon the box. The sleeve 6 is formed with a transverse slot 7 intermediate its ends and is divided lengthwise from this slit to provide oppositely arranged outwardly projecting flanges 8 and 9. The flange 9 is provided with a fulcrum lip 10 which projects towards the opposite flange 8, and the flanges 8 and 9 are provided with alining openings adapted for the reception of a bolt 11 which is adapted to have its threaded end engaged by a thumb nut 12.

In applying the improved device upon a pipe, the sleeve 6 is inserted over the pipe and the thumb nut 12 turned upon the bolt 11, thus drawing the arms 8 and 9 together and forcing the fulcrum lip 10 into contact with the arm 8, and as further movement of the nut 12 is exerted the shoulders of the flanges 8 and 9 will be forced within the area of the sleeve 6 to provide a biting shoulder which tightly grips the pipe and effectively prevents displacement or accidental removal of the box from the pipe.

Having thus fully described the invention what is claimed as new is:

In combination with a box, a connector for the purpose described, comprising a sleeve provided at one end with a circumferential attaching flange by which it is secured to the box, said sleeve being formed with a transverse slit intermediate its ends and being divided lengthwise from said slit to the end opposite said flange and provided with oppositely arranged outwardly projecting integral flanges, one of which is terminally provided with an inturned fulcrumed lip which bears against the other flange, and means for pressing said flanges together at a point between the fulcrum lip and the divided body portion of the sleeve.

In testimony whereof I affix my signature in presence of two witnesses.

FREDERIC E. BRICKNER.

Witnesses:
CHAS. H. WALLACE,
CHARLES G. FRYER.